US009486995B2

(12) United States Patent
Fiorucci

(10) Patent No.: US 9,486,995 B2
(45) Date of Patent: Nov. 8, 2016

(54) SPRING BIASED TRANSFER PRESS

(71) Applicant: Jeffrey Fiorucci, Perry Hall, MD (US)

(72) Inventor: Jeffrey Fiorucci, Perry Hall, MD (US)

(*) Notice: Subject to any disclaimer, the term of this patent is extended or adjusted under 35 U.S.C. 154(b) by 0 days.

(21) Appl. No.: 14/547,957

(22) Filed: Nov. 19, 2014

(65) Prior Publication Data

US 2015/0298452 A1 Oct. 22, 2015

Related U.S. Application Data

(60) Provisional application No. 61/906,182, filed on Nov. 19, 2013.

(51) Int. Cl.

| | |
|---|---|
| ***B32B 37/00*** | (2006.01) |
| ***B41F 16/00*** | (2006.01) |
| ***B30B 15/34*** | (2006.01) |
| ***B30B 15/04*** | (2006.01) |
| ***B41F 16/02*** | (2006.01) |

(52) U.S. Cl.

CPC ........... *B41F 16/0046* (2013.01); *B30B 15/04* (2013.01); *B30B 15/34* (2013.01); *B41F 16/02* (2013.01)

(58) Field of Classification Search

CPC .... B41F 16/0046; B41F 15/08; B30B 15/04; B30B 15/34

USPC ........................... 156/580, 581, 583.1, 583.4

See application file for complete search history.

(56) References Cited

U.S. PATENT DOCUMENTS

| | | | | |
|---|---|---|---|---|
| 3,729,357 A * | 4/1973 | Swartz | B29C 65/18 156/199 |
| 3,979,248 A | 9/1976 | Kussmaul | |
| 4,386,993 A | 6/1983 | Matsuo | |
| 4,954,206 A * | 9/1990 | Voss | B29C 65/18 156/537 |
| 4,963,208 A | 10/1990 | Muncy | |
| 5,435,883 A | 7/1995 | Myers | |
| 5,474,633 A | 12/1995 | Myers | |

* cited by examiner

*Primary Examiner* — James Sells

(74) *Attorney, Agent, or Firm* — Ober, Kaler, Grimes & Shriver; Royal W. Craig

(57) ABSTRACT

A heat press having a spring-mounted platen for foil transfers that can accommodate minor variations in garment thickness and produce a high quality foil transfer. The heat press generally comprises a rectangular frame having opposing sides, a plurality of trusses straddling and overarching the frame, and an electrically-heated platen suspended inside the frame. The platen is backed by a reinforcing member. Each truss carries a pair of opposed damping pins which are affixed to the truss, and are slidably inserted down through the reinforcing member and platen, held captive there beneath. A compression spring is mounted on each of the damping pins between said the respective truss and reinforcing member. This provides the platen with a limited degree of freedom to float against the bias of said compression springs compensate for and accommodate minor variations in garment thickness.

9 Claims, 4 Drawing Sheets

SPRING BIASED TRANSFER PRESS

CROSS-REFERENCE TO RELATED APPLICATION(S)

The present application derives priority from U.S. provisional application Ser. No. 61/906,182 filed 19 Nov. 2013.

BACKGROUND OF THE INVENTION

1. Field of the Invention

The present invention relates generally to silk-screening and, more particularly, to an improved heat press for thermally transferring various transfers including foil onto garments.

2. Description of the Background

Hot stamp transfers such as foils are used to stamp images onto various substrates such as paper, plastic film and even rigid substrates. Foil transfers have become very popular in the fashion retail industry because they produce a popular metallic mirror shine effect. For garments, a heat activated adhesive is typically silkscreened onto the garment. A sheet of foil transfer material is laid atop the garment and it is placed in a heat press. Pressed and heated areas of the foil become adhered. After removing a toil hacking the areas that have undergone pressure and heat exposure remain on the substrate, whereas unexposed areas are removed with the foil backing.

There are a variety of heat presses for transfer printing. For example, U.S. Pat. No. 4,386,993 discloses a press in which the upper platen moves relative to the lower platen by way of a cam and rocking member. U.S. Pat. No. 3,979,248 discloses a decal press with a motor driven upper platen, U.S. Pat. No. 5,435,883 discloses a hand operated press with adjustment for the gap between the platens. U.S. Pat. No. 5,474,633 discloses a press with a pneumatic engager to press the upper platen onto the lower platen and a timer mechanism. U.S. Pat. No. 4,963,208 discloses a system for applying a decorative device using a swingable upper platen.

The foil transfer process requires a specialized heat press capable of applying extremely uniform temperature and pressure across the silk-screened garment. Unfortunately, the prior art presses are fixed-bed presses not able to achieve a high degree of uniformity. What is needed is a heat press having a spring-mounted platen that can accommodate minor variations in garment thickness and still deliver a high quality thermal transfer.

SUMMARY OF THE INVENTION

A heat press having a spring-mounted platen for foil transfers that can accommodate minor variations in garment thickness and produce a high quality foil transfer. The heat press generally comprises a rectangular frame having opposing sides, a plurality of trusses straddling and overarching the frame, and an electrically-heated platen suspended inside the frame. The platen is backed by a reinforcing member. Each truss carries a pair of opposed damping pins which are affixed to the truss, and are slidably inserted down through the reinforcing member and platen, held captive there beneath. A compression spring is mounted on each of the damping pins between said the respective truss and reinforcing member. This provides the platen with a limited degree of freedom to float against the bias of said compression springs compensate for and accommodate minor variations in garment thickness.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Applicant's invention is a novel heat press for foil transfers with a floating spring-biased platen design that can accommodate minor variations in garment thickness and produce a high quality foil transfer.

Figure 1:
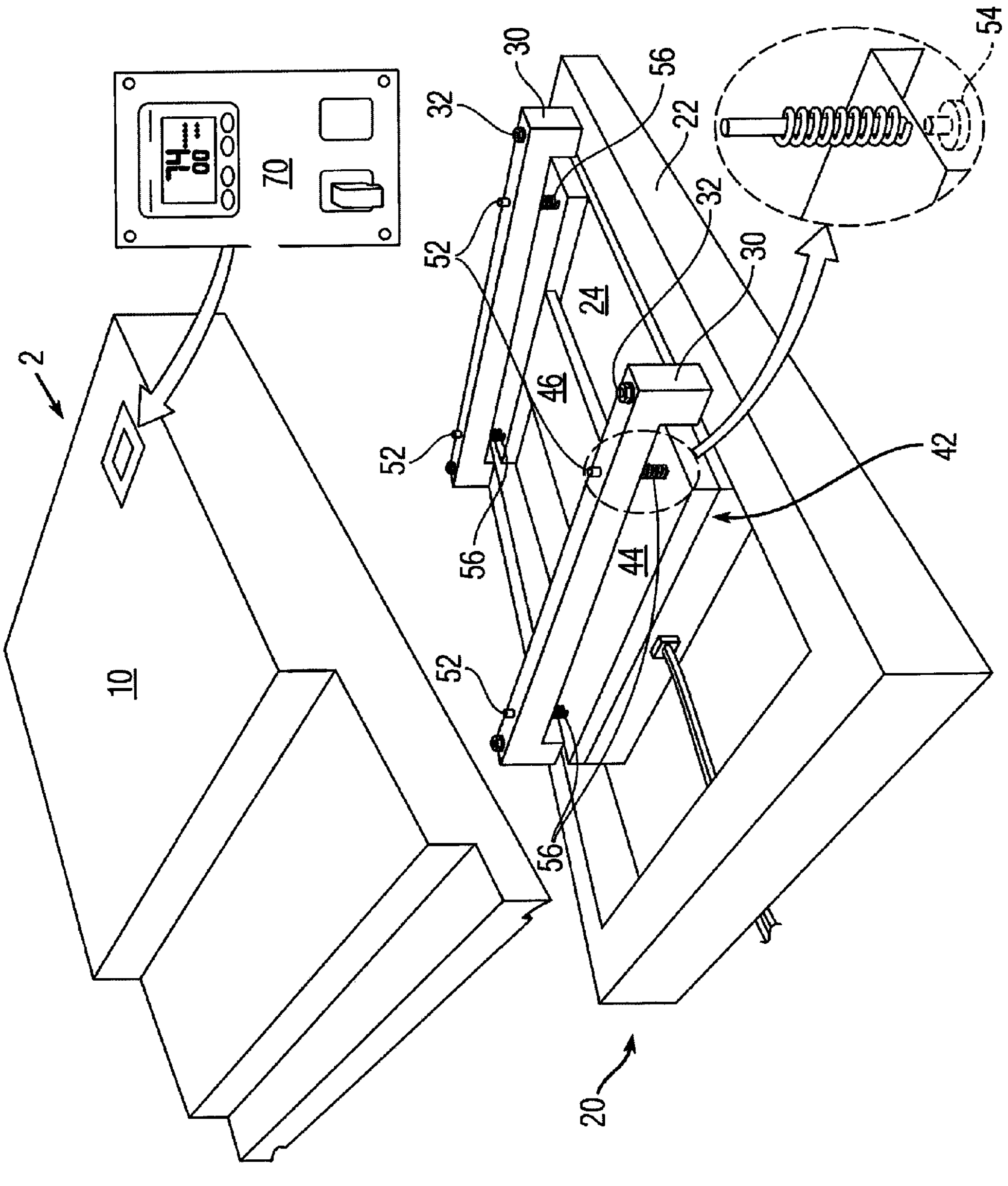
FIG. 1 is a perspective view of the heat press 2 according to an embodiment of the invention.

FIG. 1 is a perspective view of the heat press 2 according to an embodiment of the invention, with cover 10 removed. Heat press 2 generally comprises a spring-mounted upper platen assembly 20 and cover 10 that may be pressed in a conventional manner against a conventional lower platen by a known mechanism. For example, U.S. Pat. No. 4,386,993 discloses a conventional press wherein the upper platen is moved mechanically by means of cam against a lower platen. Alternatively, U.S. Pat. No. 6,983,690 shows a pneumatic pressing assembly. One skilled in the art should understand that any suitable pressing mechanism will suffice.

The present heat press 2 comprises a rectangular frame 22 supporting a rectangular floating spring-biased platen 24. The illustrated frame 2 is formed of tubular steel, and platen 24 is dimensioned to fit closely inside rectangular frame 22. Platen 24 is supported overtop frame 22 by two or more raised overarching trusses 30 which are affixed to the top edges of frame 22 by screws 32, trusses 30 straddling the platen 24 along its length. Platen 24 is reinforced by a framework 42 preferably arrayed in an T-shape across the back of platen 24 and screwed thereto. For example, framework 42 may be formed from two parallel-spaced struts 44 and a third strut 46 bridging the opposing struts 44 in a contiguous I-shaped framework 42. Each individual strut 42 is screwed directly to the platen 24. Each strut 44 is supported from above by a corresponding truss 30 on opposing ends of said truss 30, in each is suspended by a vertical rod 52. Rods 52 are fixedly secured to trusses 30 by cap nuts or the like as shown. As seen in the inset of FIG. 1, rods 52 enter two-tiered apertures 54 machined through struts 44 proximate the corners. Each two-tiered aperture 54 includes a first bore slightly larger in diameter than that of rod 52 entering strut 44 from the top, and a second bore of slightly larger diameter than the first bore entering strut 44 from the bottom and contiguous with the first bore. Each rod 54 passes through a corresponding aperture 54 but is held captive therein by a washer sized slightly larger than the first bore and seated in the second bore. The platen 24 is screwed directly to struts 44, which closes off the second bore of apertures 54 thereby capturing the washers and ends of rods 52 therein. Nevertheless, the struts 44 (and hence platen 24) is given a limited degree of freedom to float along rods 52, limited by the travel of the washer in the larger second bore of apertures 54. Compression springs 56 are mounted on each rod 54 between the overlying truss 54 and underlying strut 44. Compression springs 56 pre-bias the platen 24 downward, and resist upward movement. This way, the platen 24 and struts 44 can float upward if necessary against the bias of springs 56 to compensate for and accommodate minor variations in garment thickness.

Figure 2:
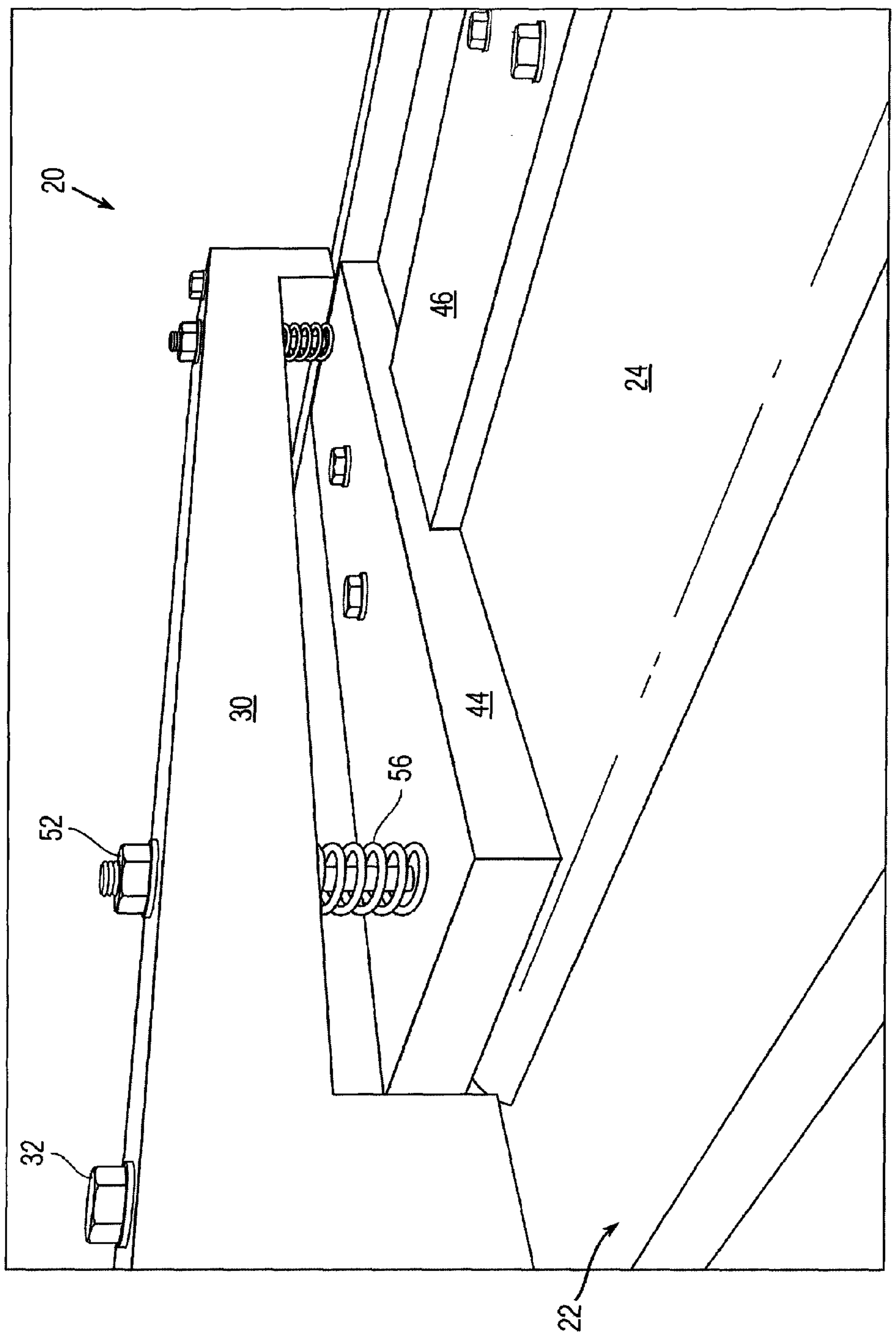
FIG. 2 is an enlarged view of the platen 24 of FIG. 1 supported by one of two trusses.

FIG. 2 is an enlarged view of platen 24 supported overtop by one of two trusses 30 affixed to the top edges of frame 22 by screws 32.

Figure 3:
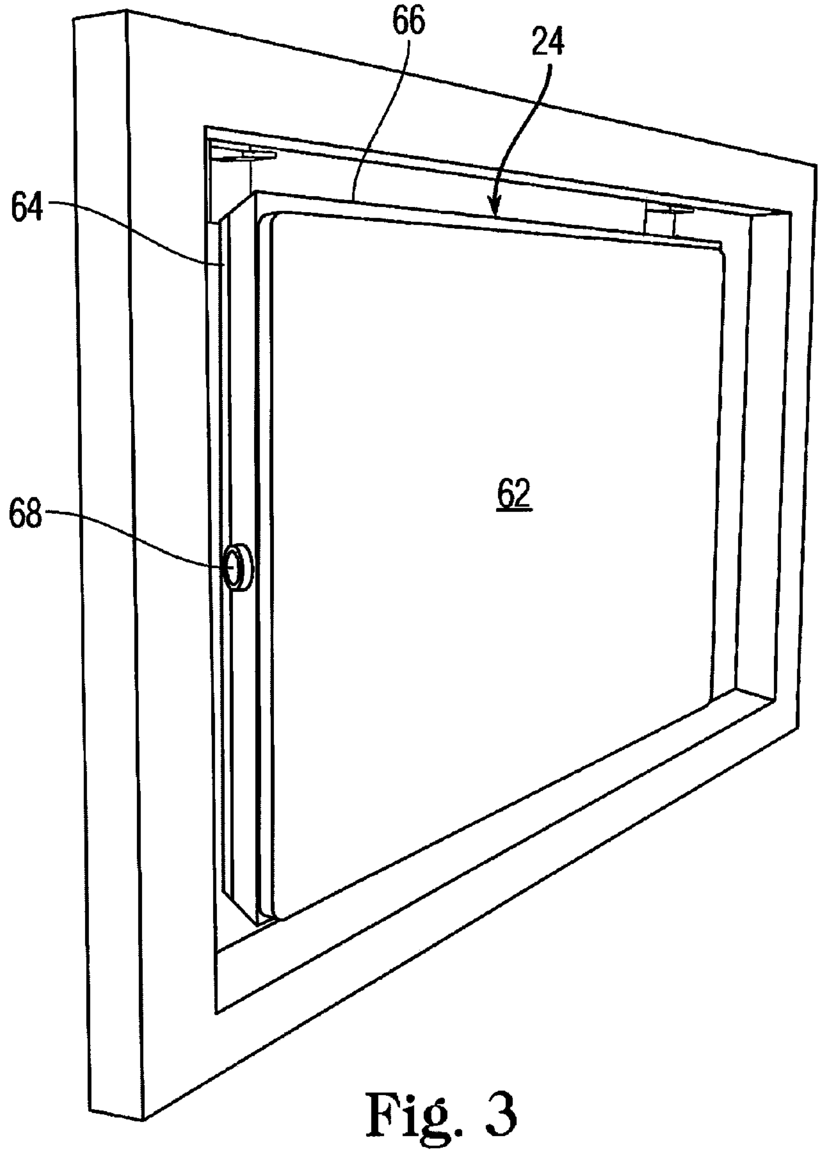
FIG. 3 is a bottom view of platen 24.
Figure 4:
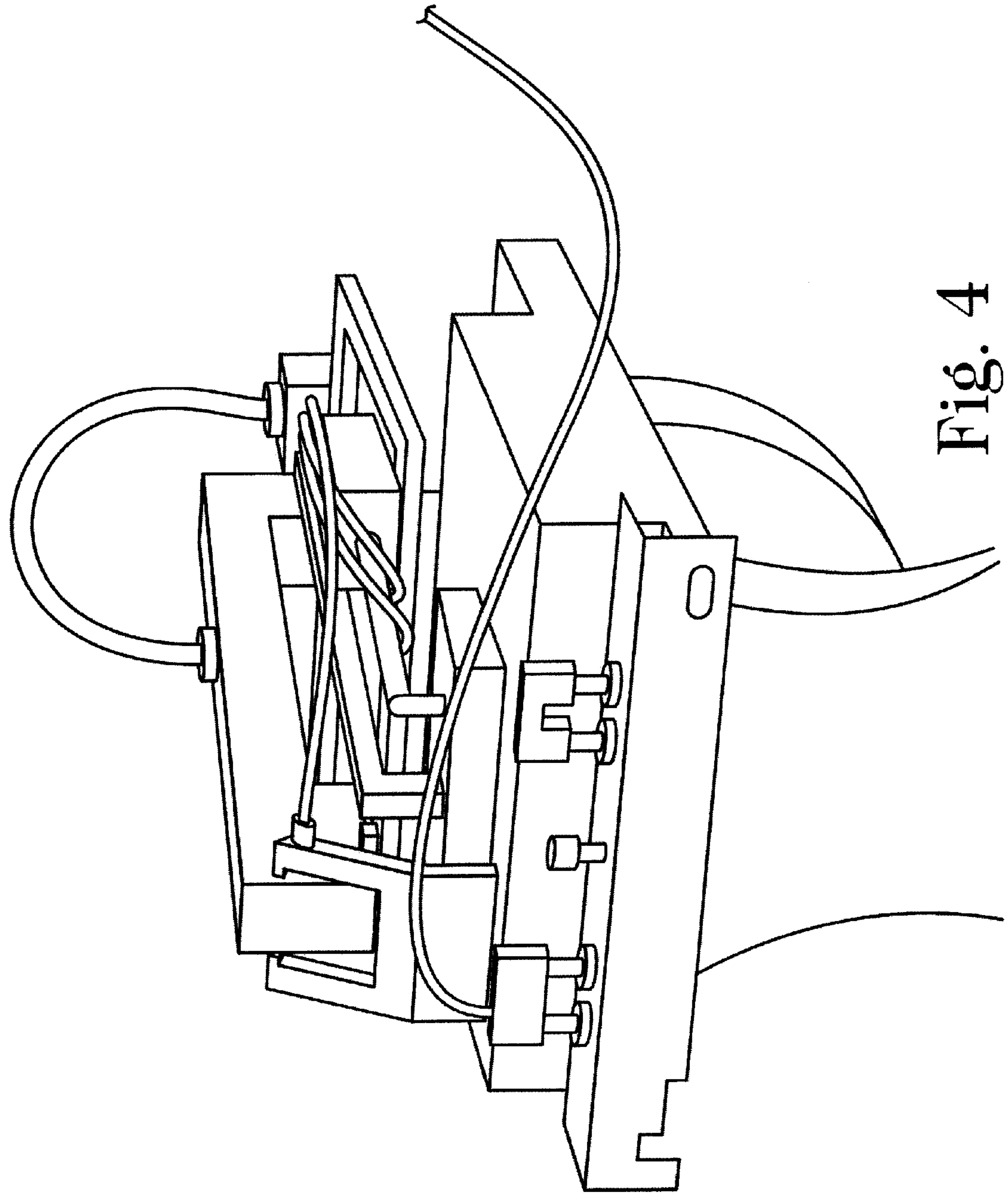
FIG. 4 is a perspective view of the heat press 2 as assembled for use according to an embodiment of the invention.

FIG. 3 is a bottom view of platen 24. Platen 24 comprises a flat rectangular lower plate 62 preferably formed of a highly-thermally-conductive metal such as aluminum. Platen 24 also includes an upper section 64 adjacent the lower plate 62 which upper section includes one or more heating elements not shown) such as conventional resistive heating elements and the like, which may be formed as serpentine or otherwise wound throughout the surface area of upper section 64. The heating element(s) are coupled to a typical power supply through a switch and/or programmable logic controller (PLC), and may be configured for adjusting the temperature of the heating element, e.g., by way of the PLC. One skilled in the art will also understand that the upper section 64 may also embed a thermo-sensor to generate temperature information for the PLC, or alternatively the electrical circuit for the heating element may include a temperature control such as a thermostat. The upper section 64 may also embed a pressure-sensor. Both thermo-sensor and pressure sensor may be connected to a digital display 70 (FIG. 1) panel-mounted on the cover 10. The display 70 preferably includes a timer as shown to provide the user with pressure (bar), temperature (degrees) and time (seconds) indications. For best results it is usually preferred to ensure a dwell time for the upper platen to be in contact with the lower platen for 3-10 seconds, at a temperatures of about 190-200° F., at a pressure of about 2-3 bar.

The illustrated embodiment includes a heat shroud 66 that envelopes both the upper section 64 and lower plate 62, leaving the lower face of lower plate 62 fully exposed. The heat shroud 66 may be molded of thermally insulating material such as thermoset polytetrafluoroethylene (PTFE) or fluorinated ethylene propylene (FEP), both of which are melt-processible using conventional injection molding techniques. PTFE and FEP is sold under the brandnames Teflon® PTFE/FEP from Du Pont or Polyflon™ PTFE or Neoflon® FEP from Daikin. Heat shroud may be attached to the lower plate 62 by detent buttons 68 for ease of disassembly.

The foregoing heat press improves foil transfers with its four-point floating spring-biased platen design and can accommodate minor variations in garment thickness or other irregularities to produce a higher quality foil transfer.

The above-described embodiment is for the purpose of promoting an understanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

I claim:

1. A heat press for combined thermal and pressure application of transfers to garments, comprising:

a rectangular frame having opposing ends and opposing sides defining a rectangular aperture;

a plurality of trusses all attached to and overarching said frame;

an electrically-heated flat rectangular platen conforming to and suspended inside the rectangular aperture of said frame;

a reinforcing framework of struts fixedly attached atop said platen;

a first pair of opposed damping pins slidably traversing said reinforcing framework of struts, said platen, and one of said plurality of trusses on opposite sides of said frame;

a second pair of opposed damping pins slidably traversing said reinforcing framework of struts, said platen, and another of said plurality of trusses on opposite sides of said frame; and at least four compression springs each mounted on a corresponding one of said damping pins between said plurality of trusses and said reinforcing member;

whereby said platen has a limited degree of freedom to float against the bias of said at least four compression springs to thereby compensate for and accommodate minor variations in garment thickness.

2. The heat press according to claim 1, wherein said rectangular frame is formed of tubular steel.

3. The heat press according to claim 2, wherein the reinforcing framework of struts are arranged in an I-shape having four corners.

4. The heat press according to claim 3, wherein the rectangular platen has four corners, and the four corners of said I-shaped reinforcing framework are attached at the corresponding four corners of said rectangular platen.

5. The heat press according to claim 4, wherein the first pair of opposed damping pins slidably traverse one of said plurality of trusses inside the rectangular aperture of said frame and slidably traverse both said reinforcing framework of struts and said platen at opposed corners.

6. The heat press according to claim 5, wherein the second pair of opposed damping pins slidably traverse another of said plurality of trusses inside the rectangular aperture of said frame and slidably traverse both said reinforcing framework of struts and said platen at opposed corners.

7. The heat press according to claim 3, wherein each of the four corners of the reinforcing framework of struts is defined by a two-tiered aperture.

8. The heat press according to claim 7, wherein each of the damping pins of both the first and second pair of opposed damping pins is held captive within a corresponding one of the two-tiered apertures of the reinforcing framework of struts.

9. The heat press according to claim 2, wherein the opposing ends and opposing sides of said rectangular frame are formed of tubular steel circumscribing said rectangular aperture.

* * * * *